United States Patent
Kalka et al.

[11] 4,020,032
[45] Apr. 26, 1977

[54] CONTINUOUS PROCESS FOR THE REMOVAL OF MONOMERIC IMPURITIES FROM AQUEOUS DISPERSIONS OF HOMO- AND COPOLYMERS OF VINYL CHLORIDE

[75] Inventors: Josef Kalka, Herten; Hermann Winter, Marl; Jurgen Beckmann, Oer-Erkenschwick, all of Germany

[73] Assignee: Chemische Werke Huls Aktiengesellschaft, Marl, Germany

[22] Filed: Aug. 21, 1975

[21] Appl. No.: 606,736

[30]  Foreign Application Priority Data
Aug. 27, 1974   Germany ..................... 2440957

[52] U.S. Cl. .................. 260/29.6 R; 260/29.6 PT; 260/29.6 B
[51] Int. Cl.² ........................................ C08L 57/08
[58] Field of Search ............... 260/29.6 R, 29.6 PT, 260/92.8 A, 92.8 W, 29.6 B

[56]  References Cited
UNITED STATES PATENTS
3,371,059   2/1968   Rich ........................ 260/29.6 R
FOREIGN PATENTS OR APPLICATIONS
1,248,943   8/1967   Germany ..................... 260/29.6 R

*Primary Examiner*—M. J. Welsh
*Attorney, Agent, or Firm*—Millen & White

[57]  ABSTRACT

A process for removing residual monomer from an emulsifier-containing aqueous dispersion of a solid vinyl chloride polymer having a surface tension of less than 60 dyne/cm., which comprises continuously admixing the polymer dispersion with steam in a fluid flow pipe under a pressure of 150–600 torr at a flow velocity of 1–20 m./sec., and passing said admixture at an exit velocity of 30–100 m./sec. horizontally into and along the walls of a degasification tank having a pressure 30–200 torr lower than the pressure in said flow pipe to evaporate residual monomer.

10 Claims, 1 Drawing Figure

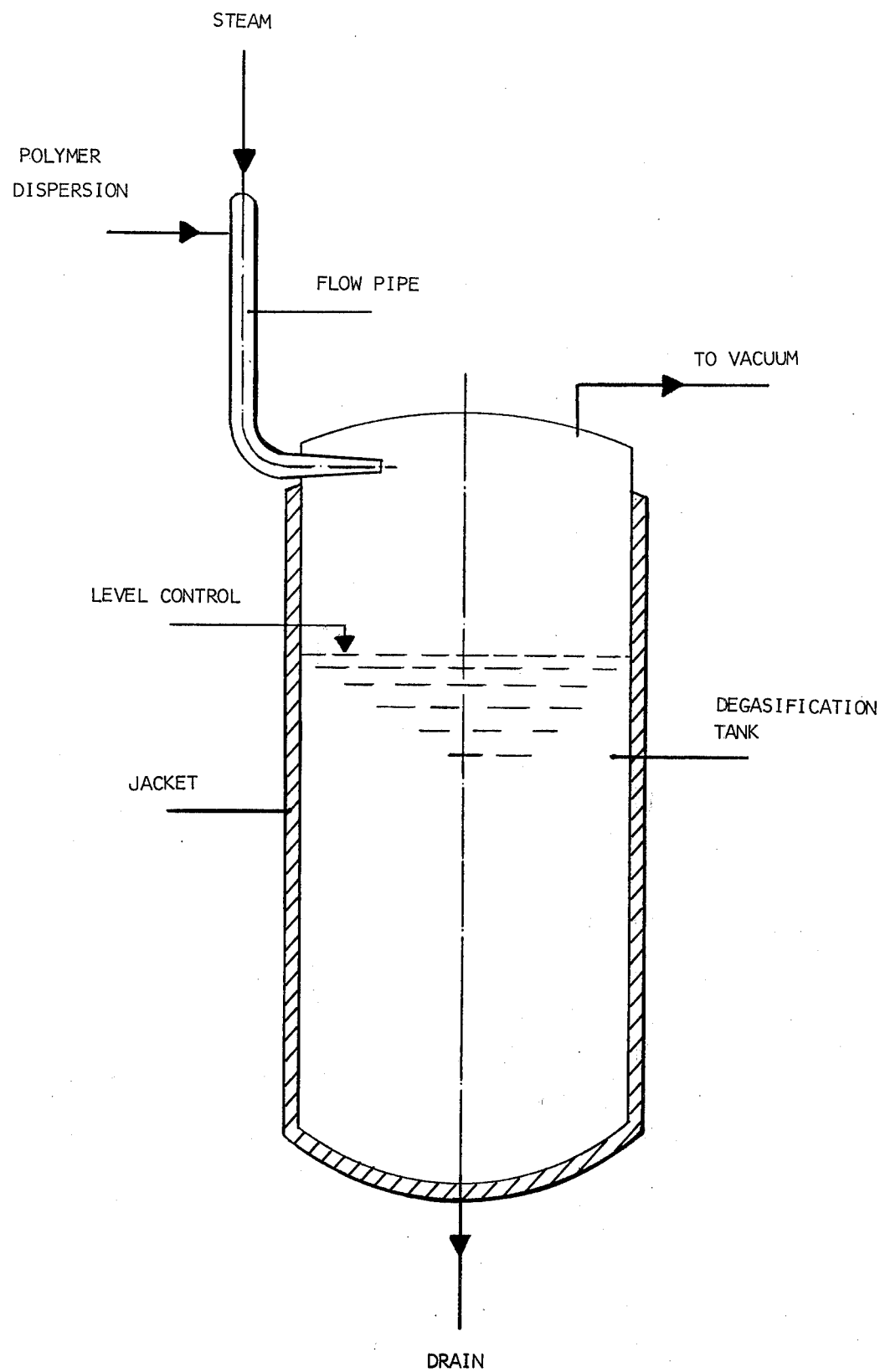

CONTINUOUS PROCESS FOR THE REMOVAL OF MONOMERIC IMPURITIES FROM AQUEOUS DISPERSIONS OF HOMO- AND COPOLYMERS OF VINYL CHLORIDE

BACKGROUND OF THE INVENTION

The production of homo- and copolymers of vinyl chloride by polymerization in an aqueous emulsion is well known, e.g., as described in the monograph by Kainer, "Polyvinylchlorid und Vinylchlorid-Mischpolymerisate" (Polyvinyl Chloride and Copolymers of Vinyl Chloride), Springer publishers, Berlin/Heidelberg/New York, 1965, pp. 34 et seq.

During emulsion polymerization of vinyl chloride, polymerization generally is not continued until a quantitative conversion of the monomers has been attained. In many cases, the polymerization is also deliberately interrupted at a low conversion. In all cases, considerable amounts of residual mnomers remain in the dispersions.

The removal of a large part of unreacted monomers is conventionally effected by expansion and/or evacuation customarily within the polymerization reactor; the vinyl chloride, removed by suction, is recycled to a gasometer. In spite of these measures for the recovery of vinyl chloride, the aqueous dispersion still contains about 1-2% by weight of residual monomer, based on the polymer. During the spraydrying of dispersions obtained from emulsion polymerization, more than 95% by weight of the monomer content escapes, together with the dryer exhaust air, into the atmosphere. In the spray-drying of polyvinyl chloride, only physiologically acceptable residual monomer contents on the order of 1-20 p.p.m. remain in the polymer composition.

However, in conjunction with constantly increasing efforts to reduce environmental pollution, the problem has arisen of how to reduce the heretofore considerable emissions of vinyl chloride in the dryer exhaust air. For this purpose, it is necessary to extensively free the polyvinyl chloride dispersions of monomeric impurities prior to the drying step.

It has been known to free synthetic resin dispersions of readily volatile monomers by storage in large expansion tanks, e.g., as taught in German Pat. No. 1,248,943, column 2, lines 4-6. However, to be effective on a technical scale, this mode of operation entails an enormous expenditure in capital equipment.

Another prior art process passes polymer dispersions such as polyvinyl chloride through trickling adsorbers countercurrently to rising inert gases to thereby free these dispersions from readily volatile compounds, e.g., see DOS (German Unexamined Laid-Open Application) No. 2,162,860. This mode of operation likewise requires excessive expenditures for capital equipment.

Steam distillation of polymer dispersions for the removal of readily volatile components has also been known, e.g., see German Pat. No. 1,248,943, column 2, lines 24-28. However, this procedure cannot be readily utilized for polymer dispersions obtained during emulsion polymerization, since these dispersions have such a low surface tension due to their emulsifier content that strong foam formation occurs during such a steam distillation.

In one conventional, discontinuously operating method described in German Pat. No. 1,248,943, the foam produced during steam distillation of dispersions having a surface tension of below 40 dyne/cm. is broken up by subjecting the thus-formed steam-dispersion foam mixture to a rapid pressure drop at flow speeds of more than 100 m./sec. The thus-broken up foam is returned from the separator to the steam distillation for recycling.

As is expressly emphasized at column 5, lines 19-22, of German Pat. No. 1,248,943, such a process can be operated continuously only with connection of several units in series as a cascade. Naturally, such a series connection of several discontinuously operating units requires great expenditures for the apparatus. Additionally, series connection of several units of the above-described type results in a great mechanical load on those dispersions which have a high solids content and a low emulsifier content, which are almost exclusively produced in modern large-scale technical processes. In a highly undesirable manner, deposits are formed from the comparatively low stability dispersions, especially in the pipelines between the degasification tanks.

OBJECTS OF THE INVENTION

Accordingly, it is a general object of this invention to provide an improved method for degasification of vinyl chloride polymer dispersions prepared by emulsion polymerization.

Another object of this invention is to provide a process for degasification of such polymer dispersions to remove residual monomer therefrom without sedimentation and coagulation.

A further object of this invention is to provide a continuous polymerization and degasification process wherein a dispersion of polymer product is directly degasified upon completion of polymerization.

An additional object of this invention is to provide a vinyl chloride degasification process which is economical in terms of both capital equipment and operating costs.

Upon study of the specification and appended claims, further objects and advantages of this invention will become apparent to those skilled in the art.

SUMMARY OF THE INVENTION

Briefly, it has now been discovered that the above difficulties can be overcome in one aspect of the present invention by providing a process for the removal of monomeric impurities from aqueous dispersions of homo- and copolymers of vinyl chloride having a surface tension of below 60 dyne/cm. by treatment with steam and avoidance of foam formation by rapid pressure drop at high flow velocities. This process is characterized by continuously mixing the dispersion with steam in a flow pipe, wherein the flow velocity of the mixture in the flow pipe is 1-20 m./sec. and the pressure in the flow pipe is 150-600 torr (mm. Hg); the mixture is discharged from the flow pipe at a velocity of 30-100 m./sec. and fed to an evacuated degasification tank wherein the pressure is 30-200 torr lower than the pressure in the flow pipe; and the mixture is continuously withdrawn therefrom.

BRIEF DESCRIPTION OF THE DRAWING

The above and other objects, features and advantages of the present invention will become more fully apparent to those skilled in the art to which this invention pertains from the following Detailed Discussion, taken in conjunction with the annexed Drawing which schematically illustrates a presently preferred apparatus for conducting the process of this invention.

DETAILED DISCUSSION

The process of this invention can be utilized, independently of the type of emulsifier and the monomer concentration, in all dispersions of homo- and copolymers of vinyl chloride having surface tensions of below 60 dyne/cm., generally 30–60 dyne/cm. and especially 30–35 dyne/cm. Vinyl chloride copolymers containing up to 50% by weight of comonomers can be employed.

Suitable comonomers are known in the art and include but are not limited to monoolefinic unsaturated compounds, e.g., vinylidene chloride or vinyl esters of straight-chain or branched carboxylic acids of 2–20 carbon atoms, preferably 2–4 carbon atoms, such as vinyl acetate, vinyl propionate or vinyl butyrate; olefinically unsaturated carboxylic acids, e.g., maleic, fumaric, itaconic, crotonic, acrylic or methacrylic acid as well as the mono- or diesters thereof with mono- or dialcohols of 1–10 carbon atoms; $\alpha$-olefins, e.g., ethylene, propylene, isobutylene, etc; aromatic olefinically unsaturated monomers, e.g., styrene; acrylonitrile; polyunsaturated monomers, etc. The comonomers are volatile, i.e., have a boiling point of less than 100° C., and which is sufficiently low to evaporate in the degasification tank.

The process of this invention can advantageously be used in connection with dispersions having a high solids content and a low emulsifier content, e.g., a solids content of 20–60 %, preferably 40–50 % by weight, and an emulsifier content sufficient to provide the required surface tension of less than 60 dyne/cm.

One mode of operation permitting the production of high solids content dispersions low in emulsifier content has been described in DAS (German Published Application) No. 1,964,029, according to which the emulsifier is continuously added in a specified manner during the polymerization process.

As polymerization catalysts, it is possible to use the water-soluble compounds customary for emulsion polymerization of vinyl chloride, which include but are not limited to hydrogen peroxide, sodium persulfate, potassium persulfate and redox systems, e.g., $H_2O_2$/ascorbic acid, in the usual catalytic concentrations. Suitable emulsifiers are likewise known in the art and include but are not limited to ionic emulsifiers, e.g., salts of carboxylic acids such as sodium caprate, sodium laurate, sodium myristate, sodium palmitate, etc; salts of primary and secondary alkyl sulfates such as sodium capryl sulfate, sodium lauryl sulfate, sodium myristyl sulfate and sodium oleyl sulfate; sulfates of esterified polyoxy compounds such as mono-fatty acid glycerol sulfuric acid esters; salts of primary and secondary alkyl sulfonates such as sodium ethyl sulfonate, sodium stearyl sulfonate, sodium oleyl sulfonate, n-alkane sulfonates with a statistical random distribution of the sulfonic acid group and a chain length of $C_{13}$–$C_{17}$, etc. It is also possible to use alkylaryl sulfonates, e.g., the Na salt of p-n-dodecylbenzene sulfonic acid. The emulsifier can be used singly or as mixtures of two or more, preferably of the same general type.

The emulsifiers can also be additionally combined with customary auxiliary agents, e.g., alcohols such as lauryl alcohol, esters such as sorbitan monolaurate and carboxylic acid glycol esters, etc.

The polymerization temperature is generally 40°–70° C., depending on the desired K-value in the polymer product. Polymerization can be conducted continuously or discontinuously.

According to the process of this invention, the dispersion and the steam are continuously fed to a flow pipe having an ambient pressure of 150–600 torr, preferably 230–600 torr, and a temperature of 60°–94° C., preferably 70–94 C. An intimate intermixing of steam and dispersion is thus effected. In general, special installations for mixing purposes are unnecessary. The average flow velocity through the flow pipe is 1–20 m./sec., preferably 2–10 m./sec.

The end of the flow pipe terminates in the upper part of a degasification tank, with a negative pressure gradient of 30–200 torr, preferably 30–75 torr, existing from the flow pipe to the degasification tank. The end of the flow pipe is tapered to achieve exit flow velocities of 30–100 m./sec., preferably 80–100 m./sec., thus serving to preclude foam formation in the degasification tank.

The average residence time of the dispersion in the degasification tank can be adjusted from about 2 minutes to 4 hours, preferably 10–180 minutes, e.g., with the aid of coils over which the dispersion flows downwardly or by providing a level control so that part of the container volume is constantly filled with dispersion.

For conducting the process of this invention, it is necessary that steam and dispersion be mixed together in a weight ratio of generally 1:5 to 1:100, preferably 1:10 to 1:50.

To ensure gentle treatment of the dispersion, saturated steam is employed. When entering the flow pipe, the steam has a temperature of at most 100° C., preferably 80°–100° C., and the dispersion has a temperature of 20°–60° C., preferably 30°–50° C.

It is especially advantageous to allow the dispersion-steam mixture to pass tangentially from the flow pipe to the wall of the degasification tank or to brake the liquid jet against baffles arranged at a shallow angle thereto. During this step, a partial separation is already effected between the residual monomers and the polymer dispersion. The separated residual monomer is then degassed while the dispersion passes continuously through the degasification tank, and the monomer and the steam are discharged together from the tank.

One suitable nozzle useful in the process of this invention is the so-called "Field nozzle" described in German Pat. No. 731,756. An apparatus suitable for conducting the process of this invention is shown schematically in the FIGURE. A flow pipe having inlet connections for the polymer dispersion and the steam is seated on a degasification tank. The degasification tank is provided with a bottom drain and an upper vacuum connection, as well as with a heatable or insulated jacket. To maintain a certain level of dispersion in the degasification tank, a level control is required.

The ratio of diameter to length of such a flow pipe is suitably 0.1–0.2. The length of the flow pipe can advantageously be 1–8 m., preferably 1.5–6 m. The ratio of the volume of the flow pipe to the dispersion throughput should be 5–50 liters to one ton of dispersion per hour from a vinyl chloride monomer content of about 2–10 % by weight, based on the dispersion. The average residence time of the dispersion in the flow pipe can be 0.05 to at most 10 seconds, preferably 0.05 to 5 seconds.

The average residence time selected for the dispersion in the degasification tank depends on the desired degree to which the residual monomer is to be removed and on the temperature of the dispersion in the degasification tank. The temperature in the latter is suitably controlled by means of the steam-dispersion mixing ratio and the pressure in the degasification tank.

The jacket of the degasification tank can be insulated or heated. In general, it is necessary to maintain temperatures higher than 70° C. in the degasification tank; normally, 55°–65° C. will be maintained.

The process of this invention can be utilized with special advantage for residual monomer removed from dispersions obtained by continuous polymerization, since the polymerization and degasification steps can be directly series-connected to provide a complete continuity of production and degasification. However, the process of the present invention is also very well suited for dispersions obtained by discontinuous polymerization and thus having lower emulsifier contents, since the present process treats such dispersions, which are relatively unstable because they are low in emulsifier content, in a very gentle manner.

The process makes it possible to degas dispersions almost quantitatively with low expenditures for capital equipment. Mechanical stresses on the polymer dispersion are extremely minor, because the dispersion is conducted through the degasification apparatus along a short path without the use of pumps. Accordingly, the stability of the dispersion is not impaired and deposits of coagulate and sediment are small. The process operates practically maintenance-free for periods of up to 6 months or longer. The process is furthermore particularly economical in its operation because the amounts of steam employed are very low.

Defrothers may but need not be used for conducting the process. If conventional defrothers are employed, it is possible to employ a lower exit velocity of the steam-dispersion mixture from the flow pipe, e.g., of 10–60 m./sec.

The following examples will serve to further explain the mode of operation according to this invention and demonstrate the advance in the art attained by the present invention.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight. Surface tension values were determined according to the method F. Kohlrausch, "Praktische Physik", Verlag B. G. Teubner, Stuttgart, Band 1, 22. Auflage, Kapitel 2.7.5.2, Adhaesionswaage, Seite 187.

EXAMPLE 1

A pipe having a length of 1,500 mm. and an internal diameter of 280 mm., the end of which tapers to 45 mm. (along a 15° angle of inclination with respect to the longitudinal axis) and is arranged tangentially to the upper inner wall of an insulated degasification tank having a diameter of 1,600 mm. and a height of 3,000 mm., is charged with 1.5 tons per hour of a polyvinyl chloride dispersion prepared according to Example 1 of DOS No. 2,208,442 from a continuously operated polymerization autoclave and with 100 kg. per hour of steam from a steam saturator. The temperature in the flow pipe is 70° C. and the pressure 230 torr. The flow velocity is 2,3 m./sec. and the exit velocity 90 m./sec. By means of a liquid level control device, a dispersion volume of 4 m³ is maintained in the degasification tank.

The dispersion employed has a solids concentration of 48% by weight, a residual vinyl choride monomer concentration of 5% by weight, an alkyl sulfonate concentration of 2.2% by weight, a surface tension of 34 dyne/cm. and a temperature of 35° C. A pressure of 190 torr is maintained in the degasification tank. The temperature therein is 65° C. and the average residence time is 2.7 hours.

From the degasification tank, the dispersion is discharged by means of a pump arranged 15 meters below the discharge outlet.

The dispersion discharged from the degasification tank has a vinyl chloride monomer concentration of only 50 p.p.m. After three weeks of operation, no deposits of polymer can be observed in the flow pipe.

EXAMPLE 2

The procedure of Example 1 is followed, but using a flow pipe having an internal diameter of only 82 mm. 7.0 tons of polyvinyl chloride dispersion and 235 kg. of steam are utilized per hour. The dispersion employed has a temperature of 50° C., 15° lower than that used in Example 1. In the flow pipe, the pressure is 240 torr and the temperature 70° C. The flow velocity is 5 m./sec. and the exit velocity 60 m./sec.

A pressure of 175 torr is set in the degasification tank, wherein the temperature is 63° C. and the average residence time 35 minutes. The dispersion passing out of the degasification tank has a vinyl chloride monomer concentration of 400 p.p.m.

EXAMPLE 3

The procedure of Example 2 is repeated using a dispersion of a vinyl chloride copolymer prepared in accordance with Example 2 of DOS 2,208,442 containing 85% by weight of vinyl chloride and 15% by weight of vinyl acetate. The temperature of the dispersion employed is 50° C., the surface tension is 35 dyne/cm., the solids content is 46% by weight and the mnomer content is 5% by weight. The flow velocity is 5 m./sec. and the exit velocity 60 m./sec.

The dispersion withdrawn from the degasification tank has a vinyl chloride concentration of 420 p.p.m.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for removing residual monomer from an emulsifier-containing aqueous dispersion of a solid vinyl chloride polymer which dispersion has a surface tension of less than 60 dyne/cm., which comprises:
    a. continuously admixing said dispersion with steam having a temperature of not greater than 100° C. in a fluid flow pipe to form an admixture therein having a pressure of 150–600 torr, a temperature of about 60°–94° C. and a flow velocity therethrough of 1–20 m./sec;

b. passing said admixture at an exit velocity of 30-100 m./sec horizontally into and along the walls of a degasification tank having a pressure 30-200 torr lower than the pressure in said flow pipe to evaporate residual monomer from said dispersion; and c. continuously withdrawing the resultant dispersion from the degasification tank.

2. A process according to claim 1, wherein the average residence time of said admixture in the degasification tank is about two minutes to about four hours.

3. A process according to claim 1, wherein saturated steam is employed in a weight ratio of steam: dispersion of 1:5 to 1:100.

4. A process according to claim 1, wherein said vinyl chloride polymer is polyvinylchloride or a copolymer of vinyl chloride with vinyl acetate.

5. A process according to claim 1, wherein the polymer dispersion withdrawn from the degasification tank has a vinyl chloride monomer content of less than 500 p.p.m.

6. A process according to claim 1 continuously conducted on the product of a vinyl chloride emulsion polymerization reaction in series with the polymerization reactor.

7. A process according to claim 1, wherein the flow pipe velocity is 2-10 m./sec. and the average residence time in the flow pipe is 0.05-10 seconds.

8. A process according to claim 7, wherein saturated steam is employed in a weight ratio of steam: dispersion of 1:10 to 1:50.

9. A process according to claim 8, wherein the average residence time in the degasification tank is 10-180 minutes.

10. A process according to claim 9, wherein said flow pipe feeds tangentially into the upper wall of a degasification tank.

* * * * *